United States Patent
Lo et al.

(10) Patent No.: US 11,315,358 B1
(45) Date of Patent: Apr. 26, 2022

(54) METHOD AND SYSTEM FOR DETECTION OF ALTERED FINGERPRINTS

(71) Applicant: Idemia Identity & Security USA LLC, Billerica, MA (US)

(72) Inventors: Peter Zhen-Ping Lo, Mission Viejo, CA (US); Hui Zhu, Anaheim, CA (US)

(*) Notice: Subject to any disclaimer, the term of this patent is extended or adjusted under 35 U.S.C. 154(b) by 0 days.

(21) Appl. No.: 17/134,284

(22) Filed: Dec. 26, 2020

Related U.S. Application Data (60) Provisional application No. 62/954,209, filed on Dec. 27, 2019.

(51) Int. Cl.
*G06V 40/12* (2022.01)
*G06V 40/40* (2022.01)
*G06V 40/13* (2022.01)

(52) U.S. Cl.
CPC .......... *G06V 40/1376* (2022.01); *G06V 40/13* (2022.01); *G06V 40/1359* (2022.01)

(58) Field of Classification Search
CPC ... G06K 9/001; G06K 9/00013; G06K 9/0008
See application file for complete search history.

(56) References Cited

U.S. PATENT DOCUMENTS

| | | | |
|---|---|---|---|
| 2018/0165508 A1* | 6/2018 | Othman | G06K 9/42 |
| 2020/0193138 A1* | 6/2020 | Li | G02B 5/201 |
| 2021/0173908 A1* | 6/2021 | Setterberg | G06K 9/00107 |
| 2021/0209336 A1* | 7/2021 | Jonsson | G06K 9/6247 |

* cited by examiner

*Primary Examiner* — Lixi C Simpson
(74) *Attorney, Agent, or Firm* — Robert Alexander Ellis Facey; Adam Foster Lewental (57) ABSTRACT

A method for detection of altered fingerprints includes receiving, by at least one processor, an image of a fingerprint from a fingerprint reader. The image has an image resolution. The processor determines a spatial location of the fingerprint within the image. The processor crops the image around the spatial location to provide a cropped image. The processor generates multiple derived images using the cropped image, such that each derived image has the image resolution. The processor generates a multiple-channel image using the derived images. The processor scales the multiple-channel image to an image size. The processor generates a score using a machine learning model. The score is based on the multiple-channel image and is indicative of a likelihood that the fingerprint has been altered.

19 Claims, 6 Drawing Sheets

METHOD AND SYSTEM FOR DETECTION OF ALTERED FINGERPRINTS

CROSS-REFERENCE TO RELATED APPLICATIONS

This application claims priority to U.S. Provisional Application Ser. No. 62/954,209, filed on Dec. 27, 2019, which is incorporated by reference in its entirety herein.

FIELD OF THE INVENTION

This description relates generally to security improvement and specifically to a method and system for detection of altered fingerprints.

BACKGROUND

Fingerprint detection and identification is sometimes used for criminal and civil applications to identify a person or verify a person's identity. However, a subject for fingerprinting may sometimes attempt to deceive the system and avoid being identified.

SUMMARY

A method and system for detection of altered fingerprints is disclosed. At least one processor receives an image of a fingerprint from a fingerprint reader. The image has an image resolution. The processor determines a spatial location of the fingerprint within the image. The processor crops the image around the spatial location to provide a cropped image. The processor generates multiple derived images using the cropped image, such that each derived image has the image resolution. The processor generates a multiple-channel image using the derived images. The processor scales the multiple-channel image to an image size. The processor generates a score using a machine learning model. The score is based on the multiple-channel image and is indicative of a likelihood that the fingerprint has been altered.

In one or more embodiments, the image of the fingerprint is associated with a roll method or a slap method.

In one or more embodiments, the image resolution is greater than 200 dots per inch.

In one or more embodiments, the spatial location of the fingerprint within the image corresponds to a bounding box of the fingerprint. Cropping the image is performed at the bounding box.

In one or more embodiments, cropping the image is performed, such that the cropped image covers a majority of the fingerprint.

In one or more embodiments, generating the derived images includes extracting, by the processor, multiple feature maps from the cropped image.

In one or more embodiments, generating the multiple derived images includes normalizing, by the processor, the cropped image using a mean or a variance.

In one or more embodiments, generating the derived images includes generating, by the processor, a binary version of the cropped image using dynamic thresholding.

In one or more embodiments, generating the derived images includes preprocessing, by the processor, the cropped image using image enhancement or directional smoothing.

In one or more embodiments, generating a derived image includes extracting, by the processor, a raw orientation map of the fingerprint within the cropped image to provide the derived image.

In one or more embodiments, generating the derived images includes generating, by the processor, a ridge skeleton map of the fingerprint within the cropped image.

In one or more embodiments, generating the derived images includes generating, by the processor, a minutiae density map derived from raw minutiae in the cropped image.

In one or more embodiments, the multiple-channel image includes a stack of at least two of the derived images. A number of channels of the multiple-channel image equals a number of derived images in the stack. An order of the channels is associated with a designated sequence of the derived images in the stack.

In one or more embodiments, the multiple-channel image includes a single-channel image, such that a number of channels of the multiple-channel image equals one.

In one or more embodiments, each of training the machine learning model and generating the score using the machine learning model uses a particular order of channels of the multiple-channel image.

In one or more embodiments, the image size corresponds to a number of inputs of the machine learning model.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Automated fingerprint identification systems (AFIS) are sometimes used for criminal and civil applications to identify a person or verify a person's identity. However, individuals sometimes try to deceive the system and avoid being identified. For example, an individual can alter their fingerprints, either by physically reshaping or cutting their fingers before a fingerprint is taken or by altering an image of a fingerprint. The embodiments disclosed herein provide methods, apparatus, and systems for detecting when a fingerprint has been altered. In some embodiments, a measure of image quality, such as a National Institute of Standards and Technology (NIST) fingerprint image quality (NFIQ) assessment is used to extract features from an image of a fingerprint. The features are used for detecting whether the fingerprint has been altered. In other embodiments, a minutiae density map or a ridge flow discontinuity map is used to generate feature vectors and train a support vector machine (SVM) classifier for detecting altered fingerprints. For example, a convolutional neural network (CNN) using deep learning can be implemented to detect altered fingerprints using raw fingerprint images. In other embodiments, a smaller dataset having fingerprints from a single source are used for training a machine learning model to detect altered fingerprints.

General Overview

Fingerprints are sometimes used for identification of individuals in criminal investigations. For example, a fingerprint can be used for identifying an individual using an invariant biometric identifier. A next-generation identification (NGI) system based on fingerprints can achieve a true positive identification rate of 99.6% and a false positive rate of 0.1% in a "lights out" mode. A lights out mode refers to a mode requiring minimal human assistance. An image of a fingerprint is presented as input and the output includes a short candidate list of one or more individuals. However, the accuracy of the traditional NGI system can drop when it encounters images of altered fingerprints whose friction ridges are degraded or destroyed. An altered fingerprint can be enrolled intentionally by a malicious user or unintentionally by data or system malfunctions. For example, an intentionally enrolled altered fingerprint can be attempted in hope of avoiding identification by a user.

The embodiments disclosed herein provide methods, apparatus, and systems for detection of altered fingerprints using machine learning. Among other benefits and advantages, the embodiments provide improved detection of altered fingerprint detection using a machine learning model with deep learning. The disclosed embodiments enable higher accuracy compared to traditional methods on large test datasets, which contain images from multiple sources. The use of multiple derived feature images in addition to the raw fingerprint image as the inputs for deep machine learning enable more accurate detection of altered fingerprints. The use of derived feature images, such as a global or local normalized image, a global or local winterized image, a ridge flow map image, a thinned ridge image, or a minutia density image enables the machine learning model to learn not only the local and global features of each raw image, but also the higher-order relationships among the derived feature images and the raw fingerprint images.

Example Environment for Detection of Altered Fingerprints

Figure 1:
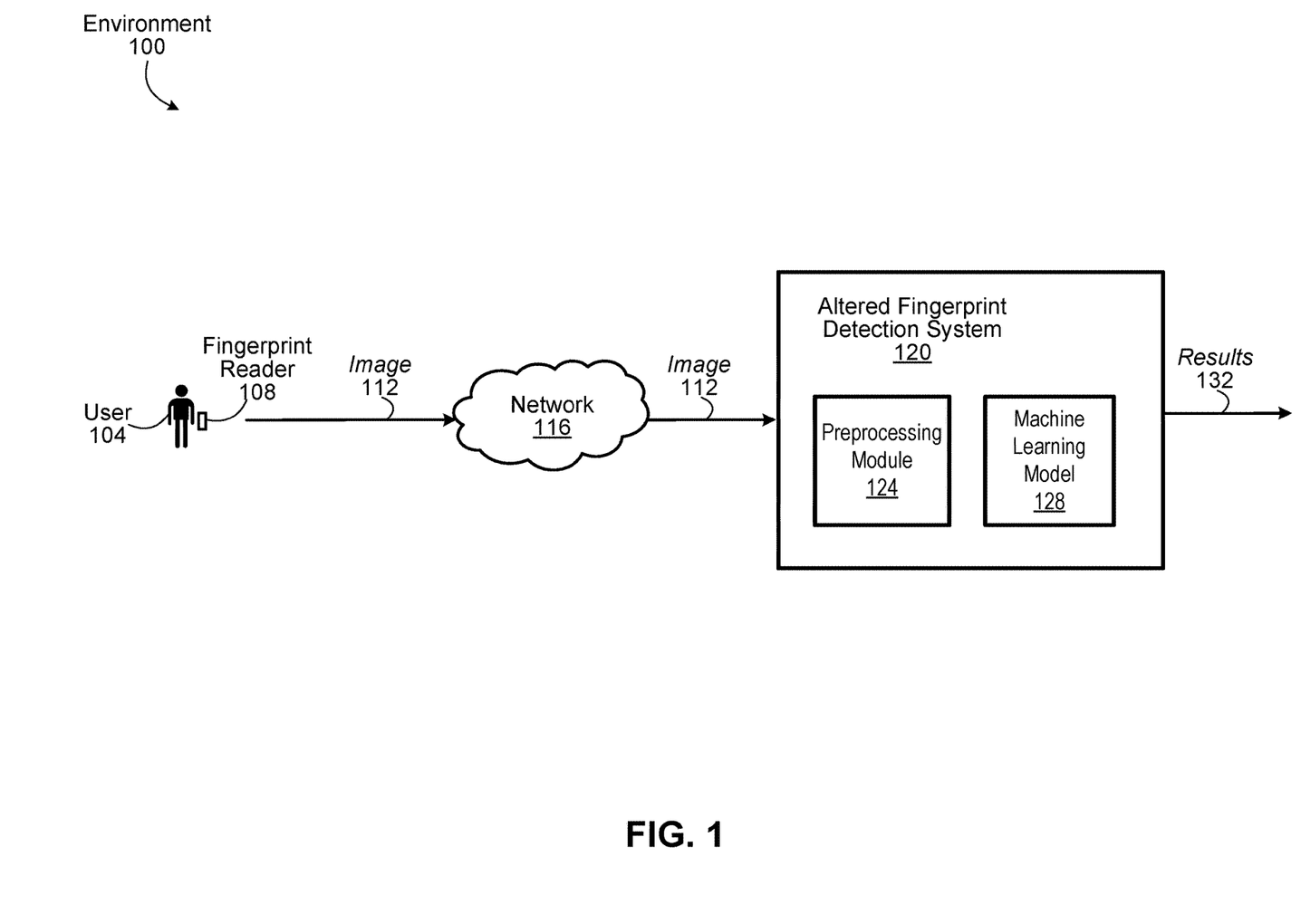
FIG. 1 is a block diagram illustrating an example environment for detection of altered fingerprints, in accordance with one or more embodiments.

FIG. 1 is a block diagram illustrating an example environment 100 for detection of altered fingerprints, in accordance with one or more embodiments. The environment 100 includes a user 104, a fingerprint reader 108, a network 116, and an altered fingerprint detection system 120. In other embodiments, the environment 100 includes additional or fewer components than those described herein. Similarly, the functions can be distributed among the components or different entities in a different manner than is described here.

The user 104 is a human user, such as a customer or enrollee who is trying to enroll into an identity system or a document creation system, e.g., a department of motor vehicles (DMV). In another example, the user 104 can be a criminal suspect who is being fingerprinted by law enforcement or another government agency. In some embodiments, the user 104 is an agent of an enrollee, e.g., a friend, a representative, or a guardian of the enrollee that is authorized to transmit the image 112 of one or more fingerprints of the enrollee to the altered fingerprint detection system 120.

The fingerprint reader 108 takes an image of at least one fingerprint of the user 104. The fingerprint reader 108 can be a hand-held or personal digital device that includes a fingerprint image sensor or a camera, e.g., a smartphone, a tablet, a PC, or a laptop. The fingerprint reader 108 can also be a digital camera or a desktop. The fingerprint reader 108 is implemented using one or more of the example components—display 512, input device 514, processor 504, main memory 506, or communication interface 518, illustrated and described in more detail with reference to FIG. 5. The fingerprint reader 108 captures an image 112 of the fingerprints of the user 104 and transmits the image 112 of the fingerprint to the altered fingerprint detection system 120.

In some embodiments, the image 112 of the fingerprints is associated with a roll method or a slap method. In a roll method, a rolled impression of a fingerprint of the user 104 is created by rolling a finger from nail edge to nail edge to capture the friction surface of the finger. The surface of a rolled impression enables more accurate classification and provides an increased number of points for comparison. In a slap method, fingerprints are captured by pressing the four fingers of a hand of the user 104 onto the fingerprint reader 108. Slap fingerprints enable quicker capture of all 10 fingers.

The network 116 connects the fingerprint reader 108 to the altered fingerprint detection system 120. The network 116 includes networking resources (for example, networking equipment, nodes, routers, switches, and networking cables) that interconnect the fingerprint reader 108 to the altered fingerprint detection system 120 and also help facilitate the altered fingerprint detection system 120's access to data storage and cloud computing services. In some embodiments, the network 116 represents any combination of one or more local networks, wide area networks, or internetworks coupled using wired or wireless links deployed using terrestrial or satellite connections. Data exchanged over the network 116, is transferred using any number of network layer protocols, such as Internet protocol (IP), multiprotocol label switching (MPLS), asynchronous transfer mode (ATM), frame relay, etc. Furthermore, in embodiments where the network 116 represents a combination of multiple sub-networks, different network layer protocols are used at each of the underlying sub-networks. In some embodiments, the network 116 represents one or more interconnected internetworks, such as the public Internet or a secure channel (e.g., a VPN) from the fingerprint reader to the altered fingerprint detection system 120. For example, the network 116 can include one or more of the example components—Internet 528, a portion of the Internet service provider (ISP) 526, local network 522, host 524, or network link 520—illustrated and described in more detail with reference to FIG. 5.

The altered fingerprint detection system 120 receives, using at least one processor, the image 112 of a fingerprint from the fingerprint reader 108. An example processor 504 is illustrated and described in more detail with reference to FIG. 5. The altered fingerprint detection system 120 automatically detects whether the fingerprint of the user 104 has been altered. The altered fingerprint detection system 120 can further notify an enrolling agency, department, or entity that a fingerprint of the enrollee has been altered. For example, a fingerprint can be altered by cutting, burning, touching a strong chemical, or taking a drug. Intentional altering of a fingerprint can be performed by abrading, surgically changing (e.g., distorting or transplanting), burning, or applying chemicals to cause the destruction of friction ridge patterns, which leads to a different appearance of the original fingerprint. The embodiments disclosed herein relate to the detection of intentionally altered fingerprints.

In some embodiments, the altered fingerprint detection system 120 is implemented using computer hardware and software on the fingerprint reader 108 itself. In other embodiments, the altered fingerprint detection system 120 is located on a local computer that the user 104 can access locally or a remote computer system. The altered fingerprint detection system 120 is implemented using one or more of the components of the example computer system 500, illustrated and described in more detail with reference to FIG. 5. The altered fingerprint detection system 120 includes a preprocessing module 124 and a machine learning model 128. In other embodiments, the altered fingerprint detection system 120 includes additional or fewer components than those described herein. Similarly, the functions can be distributed among the components or different entities in a different manner than is described here.

The preprocessing module 124 preprocesses the image 112 and can extract features from the image 112 for detecting altered fingerprints. The preprocessing module 124 can be implemented in hardware or software, using the example components illustrated and described in more detail with reference to FIG. 5. For example, the preprocessing module 124 can be implemented as hardware circuitry or software code that is incorporated into a computing system, such as a server system (e.g., a cloud-based server system), a desktop or laptop computer, or a mobile device (e.g., a tablet computer or smartphone). In some embodiments, the preprocessing module 124 applies dimensionality reduction (e.g., via linear discriminant analysis (LDA), principle component analysis (PCA), or the like) to reduce the amount of data in features extracted from the image 112 to produce a smaller, more representative set of data.

The image 112 of the fingerprint received by the preprocessing module 124 corresponds to an image resolution. The resolution can refer to the number of pixels in the image 112. The resolution is sometimes identified by the width and height of the image 112 as well as the total number of pixels in the image. For example, if the image 112 is 2048 pixels wide and 1536 pixels high, it will have 3,145,728 pixels. In some embodiments, the image resolution is measured in dots per inch (DPI). DPI refers to a measure of spatial printing, video, or image scanner dot density, in particular the number of individual dots that can be placed in a line within the span of 1 inch. For example, the resolution of the image 112 is greater than 200 dots per inch to provide more image detail and sharper features.

The preprocessing module 124 determines a spatial location of the fingerprint in the image 112. The spatial location refers to an area of the image 112 that is occupied by the fingerprint. The area can be rectangular, oval, circular, etc. For example, the spatial location of the fingerprint in the image 112 can correspond to a bounding box of the fingerprint. The bounding box refers to a smallest bounding or enclosing box for a set of points or pixels in the image, where the set of pixels correspond to the fingerprint. All the points or pixels in the image 112 that correspond to the fingerprint lie within the bounding box. To determine the bounding box, the preprocessing module 124 can use a linear time algorithm to generate a convex polygon (minimum-area enclosing rectangle). The preprocessing module 124 identifies a side of a minimum-area enclosing box that is collinear with a side of the convex polygon. The preprocessing module 124 enumerates boxes in linear time using a rotating calipers approach. In some embodiments, the preprocessing module 124 uses an approach to identify a minimum-perimeter enclosing rectangle for pixels that correspond to the fingerprint.

The preprocessing module 124 crops the image 112 around the spatial location corresponding to the fingerprint to provide a cropped image. The cropping is performed, such that the cropped image covers a majority of the fingerprint. For example, the cropping is performed at the bounding box. Cropping cuts off a portion of the image 112 to improve framing, increase emphasis on the fingerprint, and remove extraneous information from the image 112. In some embodiments, cropping changes the aspect ratio of the image 112, such that the cropped image has a different aspect ratio. The preprocessing module 124 generates multiple derived images using the cropped image. Each derived image has the same image resolution as the image 112. Features are extracted from the derived images for detecting whether the fingerprint in the image 112 is altered. The derived images thus provide a larger, more diverse collection of characteristics than can be extracted from the image 112 alone. The image resolution of the image 112 is maintained across the multiple derived images, such that the image quality and clarity is not compromised and information is not lost.

In some embodiments, the derived images include feature maps extracted from the cropped image. The preprocessing module 124 extracts the feature maps to generate a derived image. A feature map refers to a collection of physical features extracted from an image. For example, the preprocessing module 124 examines the cropped image using a window whose dimensions are smaller than the cropped image itself. The image is progressively moved sideways as well as up and down the cropped image. The preprocessing module 124 extracts features within the window while moving the window, for example, a horizontal line, a vertical line, a curve, a ridge, a portion of a whorl, or a combination of curves that forms a portion of a circle. Each feature in the feature map is of interest to the machine learning model 128 for determining whether the fingerprint is an altered fingerprint. The features extracted are reported in the form of a feature map (derived image). A combination of features in a particular area (a particular derived image) of the cropped image can signal that a larger, more complex feature can be found in the particular area.

In some embodiments, a derived image includes a normalized version of the cropped image. The normalization can be performed using a mean or a variance. For example, the mean pixel value of the normalized image can be 0 and the variance of the normalized image can be 1. The preprocessing module 124 can normalize the cropped image to provide a derived image by changing a range of pixel intensity values of the cropped image. Normalizing the image can cause the derived image to have a different contrast than the cropped image. In some embodiments, contrast stretching or histogram stretching is used by the preprocessing module 124 to generate the derived images.

In some embodiments, generating the multiple derived images includes generating, by the preprocessing module 124, a binary version of the cropped image using dynamic thresholding. At least one derived image includes a dynamically thresholded binary version of the cropped image. For example, the preprocessing module 124 segments the cropped image by setting all pixels whose intensity values are above a threshold to a foreground value and all the remaining pixels to a background value. In some embodiments, adaptive thresholding is used, where threshold dynamically changes across the cropped image. Dynamic thresholding can accommodate changing lighting conditions in the image, e.g. those occurring as a result of a strong illumination gradient or shadows.

In some embodiments, generating the derived images includes preprocessing, by the preprocessing module 124, the cropped image using image enhancement or directional smoothing. At least one derived image thus includes a preprocessed version of the cropped image. Image enhancement refers to a process for improving the quality and information content of the cropped image before processing, for example, contrast enhancement, spatial filtering, or density slicing. Contrast enhancement is performed using linear transformation to expand an original range of gray level in the cropped image. Spatial filtering improves the naturally occurring linear features, such as lines, curve, and intersections of lines. Density slicing converts a continuous gray tone range of the cropped image into a series of density intervals marked by a separate color or symbol to represent different features. Directional smoothing refers to estimating a direction of coherence around each pixel location and using a window to approximate a line segment in that direction. The preprocessing module 124 thus uses the gray level distribution around each pixel that tends to be more coherent in some directions compared to other directions to preserve details of the fingerprint while suppressing noise.

In some embodiments, the preprocessing module 124 generates a derived image by extracting a raw orientation map of the fingerprint from the cropped image. At least one derived image includes the raw orientation map. The preprocessing module 124 uses one or more of quadrature filter based methods, a structure tensor, or a local polynomial approximation to generate a raw orientation map. The preprocessing module 124 can use the raw orientation map and the derived image to estimate line or edge consistency of the fingerprint, or curvature information. The preprocessing module 124 can use the raw orientation map and the derived image to detect corner points. The raw orientation map of the fingerprint provides additional features for the machine learning model 128.

In some embodiments, the preprocessing module 124 generates the derived images by extracting a ridge skeleton map of the fingerprint within the cropped image. At least one derived image includes the ridge skeleton map. A ridge of the fingerprint refers to a singularity of the distance function, for example, a ridge corresponds to locations where the gradient discontinuity occurs on a distance map. Each point in the fingerprint is assigned a value based on its distance to the nearest boundary of the fingerprint. Computing a Euclidean distance transform produces a distance map whose ridges projected back onto the image plane generate a skeleton-like structure. The ridges tend to occur near the center of anisotropic grayscale objects, for example, a fingerprint. Thus, the ridges of the distance map are useful feature descriptors of the shape of the fingerprint.

In some embodiments, generating the derived images includes generating a minutiae density map derived from raw minutiae in the cropped image. A derived image includes the minutiae density map. The fingerprint in the cropped image includes a pattern of ridges and valleys on the surface of a fingertip. The uniqueness of a fingerprint can be determined by local ridge characteristics, such as the ridges and valleys flowing in a local constant direction. The preprocessing module 124 determines the local ridge characteristics, such as ridge endings and ridge bifurcation to generate the minutae density map from the cropped image. The minutiae include the ridge endings and the ridge bifurcations (points where a ridge forks or diverges into branch ridges). The minutiae density map provides additional features for the machine learning model 128, thus improving the distinctiveness, compactness, and compatibility with features used by human fingerprint experts.

The preprocessing module 124 generates a multiple-channel image using the derived images. A color digital image includes pixels having combinations of primary colors represented by a series of code. A channel in this context is the grayscale image of the same size as a color image, but having only one primary color. For example, an RGB image has three channels: red, green, and blue. The image includes three derived images (one for each channel). In another example, a CMYK image has four channels: cyan, magenta, yellow, and key (black). A 32-bit CMYK image includes four 8-bit channels, one for cyan, one for magenta, one for yellow, and one for key color (black). In another example, a hue saturation value (HSV) stores color information in three channels, however, one channel is devoted to brightness (value), and the other two convey color information.

In some embodiments, the multiple-channel image includes a stack of at least two derived images. Stacking of the derived images (sometimes referred to as focal plane merging or z-stacking) is used to combine multiple derived images to produce a resulting multiple-channel image, for example, having a greater depth of field than any of the individual derived images. The stacking of the derived images is a computational technique, hence multiple-channel images can be generated post-capture and compared for clarity. The stacking also enables generation of images physically impossible with the imaging equipment of the fingerprint reader 108. A number of channels of the multiple-channel image equals a number of the derived images in the stack.

In some embodiments, an order of the channels is associated with a designated sequence of the derived images. For example, a color image has three channels, for the pixel value at each coordinate for the red, green, and blue components. The image data is provided to the deep learning 128 as an N-dimensional array. Hence, an ordering of the channels is used to create the array based on a designated sequence of the derived images in the stack. For example, Channel 0 is assigned to a first derived image, Channel 1 to a second derived image, Channel 2 to a third derived image, and so on. In some embodiments, the multiple-channel image comprises a single-channel image, such that a number of channels of the multiple-channel image equals one. Such an image can be especially beneficial during the training phase of the machine learning model 128 for testing and evaluation. In some embodiments, a same order of the channels of the multiple-channel image is used for training and deployment of the machine learning model 128.

The preprocessing module 124 scales the multiple-channel image to a particular size for input to the machine learning model 128. For example, the preprocessing module 124 scales the graphic primitives that make up the image using geometric transformations. The scaled image has a higher or lower number of pixels. In some embodiments, image resampling or image reconstruction is performed using Nyquist sampling. Down sampling to a smaller image from a higher-resolution image is carried out after applying a suitable two-dimensional (2D) anti-aliasing filter to prevent aliasing artifacts. The multi-channel image is reduced to the information that can be carried by the smaller image. For up sampling, a reconstruction filter takes the place of the anti-aliasing filter. In embodiments, one or more of nearest-neighbor interpolation, bilinear and bicubic algorithms, Sinc and Lanczos resampling, box sampling, mipmap generation, Fourier-transform methods, edge-directed interpolation, or vectorization are used to perform the scaling. In some embodiments, the size of the scaled multiple-channel image corresponds to inputs of the machine learning model.

The machine learning model 128 is used to generate a score 132 indicative of a likelihood that the fingerprint in the image 112 has been altered. The machine learning model 128 is implemented using one or more of the example components illustrated and described in reference to FIG. 5. For example, the machine learning model 128 can be implemented as software code that is incorporated into a computing system 500 such as a server system (e.g., a cloud-based server system), a desktop or laptop computer, or a mobile device (e.g., a tablet computer or smartphone). The machine learning model 128 is trained using training sets as illustrated and described in more detail with reference to FIGS. 2A and 3. The training data includes altered fingerprint images as well as non-altered fingerprint images having labeled features.

Machine learning techniques are used to train the machine learning model 128, that when applied to features extracted from the image 112, outputs indications of whether the image 112 has an associated property or properties. For example, when applied to features of the image 112, the machine learning model 128 estimates whether the image 112 contains an altered fingerprint. As part of the training of the machine learning model 128, a training set of features and training data is formed by identifying a positive training set of features that have been determined to have the property in question, and, in some embodiments, forms a negative training set of features that lack the property in question. In some embodiments, supervised machine learning is used to train the machine learning model 128 with the features of the positive training set and the negative training set serving as the inputs. In other embodiments, different machine learning techniques, such as a convolutional neural network (CNN), generative adversarial network (GAN), deep learning, neural networks, linear support vector machine (linear SVM), boosting for other algorithms (e.g., AdaBoost), logistic regression, naïve Bayes, memory-based learning, random forests, bagged trees, decision trees, boosted trees, or boosted stumps, can be used.

The features used for training and operation of the machine learning model 128 include features extracted from the derived images, for example, feature maps, normalized versions of the image 112, a binary version of the cropped image, an enhanced version of the cropped image, a directionally smoothed version of the cropped image, a raw orientation map of the fingerprint within the cropped image, a ridge skeleton map, and a minutiae density map derived from raw minutiae in the cropped image. In some example embodiments, a validation set is formed of additional features, other than those in the training data, which have already been determined to have or to lack the property in question. The trained machine learning model 128 is applied to the features of the validation set to quantify the accuracy of the machine learning model 128. Common metrics applied in accuracy measurement include: true positive rate (TPR)=true positives (TP)/(TP+false negatives (FN)) and false positive rate (FPR)=false positives (FP)/(FP+true negatives (TN)), where TP denotes a number the machine learning model 128 correctly detected out of the total altered fingerprints it evaluated (TP+FN), and FP denotes the number the machine learning model 128 falsely detected (TP) out of the total number of normal fingerprints it evaluated (FP+TN). A receiver operating characteristic (ROC) curve is created by plotting the TPR against the FPR at various threshold settings. In some embodiments, the machine learning model 128 is iteratively re-trained until the occurrence of a stopping condition, such as an accuracy measurement indication that the machine learning model 128 is sufficiently accurate, or a number of training rounds have taken place.

The machine learning model 128 thus provides robust detection of altered fingerprints using varied feature information. In embodiments, the machine learning model 128 can also automatically learn good feature representations from the raw image 112 using deep learning without labels. The deep learning approach has benefits and advantages over traditional classifiers for altered fingerprint detection. For example, a deep machine learning model can handle larger dimensional middle features. The machine learning model 112 does not need to craft any features for training. In addition, a deep machine learning model is less sensitive to trap into a local minimum for raw data.

Example Process for Training a Machine Learning Model

Figure 2A:
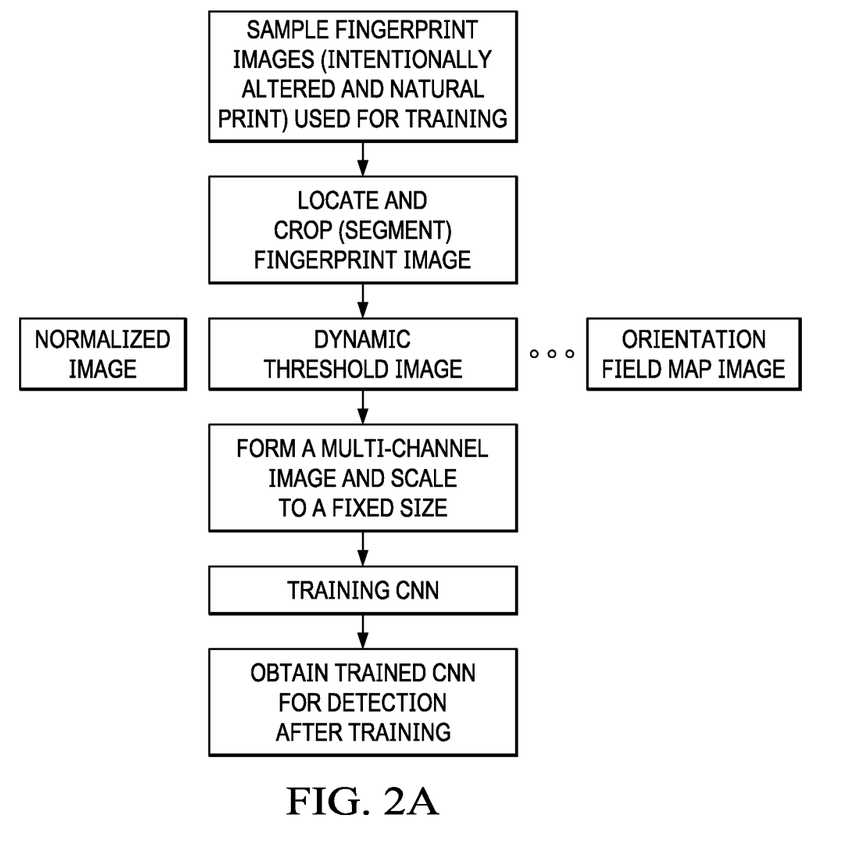
FIG. 2A is a flowchart illustrating an example process for training a machine learning model for detection of altered fingerprints, in accordance with one or more embodiments.

FIG. 2A is a flowchart illustrating an example process for training a machine learning model 128 for detection of altered fingerprints, in accordance with one or more embodiments. The machine learning model 128 is illustrated and described in more detail with reference to FIG. 1. In some embodiments, detection of fingerprint alteration uses labeled, hand crafted features to distinguish between altered and valid fingerprints. For example, an SVM is trained to detect irregularities in a ridge orientation field. The ridge orientation field refers to a global feature of the fingerprint that describes an orientation of the ridge-valley structure in each point of the fingerprint image 112. The image 112 is illustrated and described in more detail with reference to FIG. 1.

Referring to FIG. 2A, sample fingerprint images are used for training the machine learning model 128. For example, both intentionally altered fingerprints as well as un-altered (natural prints) are used. A segment of the image 112 corresponding to the fingerprint is located and cropped. As described in more detail with reference to FIG. 1, the cropped image is normalized and dynamically thresholded. An orientation field of the image is extracted. In some embodiments, a combination of minutiae density maps and orientation entropies of the ridge-flow are combined to identify altered fingerprints. For example, a fingerprint orientation field can be segmented into a number of blocks. For each block, an entropy of the orientations is determined. If the multiple-channel image is scaled multiple times at different scale settings, different orientation entropy maps can be extracted. A histogram is computed from each orientation entropy map and used to determine whether the fingerprint is altered.

In some embodiments, the machine learning model 112 is trained to detect an altered fingerprint using different local characteristics of a fingerprint image, such as identifying irregularities in the pixel-wise orientations and examining minutia orientations in local patches. Other training of the machine learning model 128 is based on examining irregularities (e.g., special features) in orientation flow or minutia maps. In some embodiments, the difference between intentionally altered fingerprints and unintentionally altered fingerprints is narrow. Features to separate intentionally altered fingerprints and unintentionally altered fingerprints can be embedded in the raw image 112 for training. Features can be enhanced or transformed from a different perspective to make the intentional and unintentional altered fingerprints more separable. In some embodiments, the machine learning model 128 is trained to distinguish between undifferentiated altered fingerprints and low-quality fingerprint images. A normal fingerprint enrolled by a user can have complex features. For example, non-intentionally altered fingerprints can be captured from a scratched, cut, skin diseased, burned, or aging finger. Features to separate non-intentionally altered fingerprints can be embedded in the raw image 112.

In some embodiments, a limited number of altered fingerprint images are used to train the machine learning model 128 using deep learning. In some embodiments, multiple preprocessed images and raw feature maps at the original image resolution are derived from the raw image 112. These feature maps are in the original image resolution to avoid losing detailed features of an altered fingerprint when extracting from a lower resolution image. The original image 112 is thereby transformed into multiple features or images for training the machine learning model 128 to make the learning easier and better features to be found for altered fingerprint detection.

In some embodiments, a CNN using deep learning is used for classification. For example, a CNN can be used to learn and evaluate salient features of altered fingerprints directly from raw fingerprint images or from the features shown in FIG. 2A. In some embodiments, the fingerprint images or features are used to train a deep CNN for detecting altered fingerprints. The CNN automatically learns good feature representations from the raw image 112 or from the extracted features. The deep learning approach has benefits and advantages over traditional classifiers for altered fingerprint detection. For example, a deep CNN can handle larger dimensional middle features. In addition, a deep CNN is less sensitive to trap into a local minimum for raw data.

Example Process for Testing and Operating a Machine Learning Model

Figure 2B:
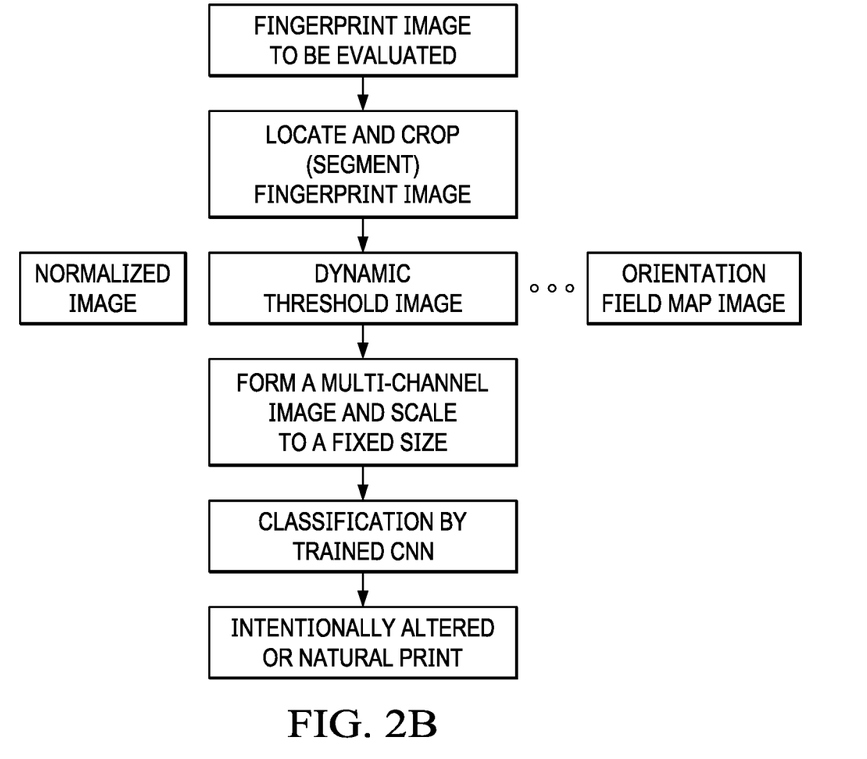
FIG. 2B is a flowchart illustrating an example process for operating a machine learning model for detection of altered fingerprints, in accordance with one or more embodiments.

FIG. 2B is a flowchart illustrating an example process for operating a machine learning model 128 for detection of altered fingerprints, in accordance with one or more embodiments. The machine learning model 128 is illustrated and described in more detail with reference to FIG. 1. The preprocessing module 124 of the altered fingerprint detection system 120 receives a fingerprint image 112 from the fingerprint reader 108 to be evaluated. The preprocessing module 124, altered fingerprint detection system 120, fingerprint image 112, and fingerprint reader 108 are illustrated and described in more detail with reference to FIG. 1.

Referring to FIG. 2B, the preprocessing module 124 addresses an uncertainty regarding a finger position within the image 112. For example, the finger can be pressed at different positions in an image frame during enrollment. The uncertainty of the position can generate extra feature dimensions. To address the uncertainty, the preprocessing module 124 determines a spatial location of the fingerprint within the image 112. An image size variation can occur among enrolled fingerprints. Fingerprint images from different sources can have different sizes. The image sizes of rolled and slap fingerprints can be different as well. The preprocessing module 124 crops the image 112 around the spatial location to provide a cropped image. For example, a bounding box is determined, as illustrated and described in more detail with reference to FIG. 1. In some embodiments, each fingerprint is located in the image 112 and cropped at a same size.

The preprocessing module 124 generates multiple derived images using the cropped image, such that each derived image has the same image resolution as the image 112. The multiple derived feature maps are used for operating the machine learning model 128. In some embodiments, generating a derived image includes normalizing the cropped image using a mean or a variance. For example, normalization of the cropped image from the original image size to a fixed size is performed. A normalized raw image can be derived from the cropped image using mean and variance. The preprocessing module 124 can generate a derived image by creating a binary version of the cropped image using dynamic thresholding. In one example, a dynamically thresholded binary image is generated from the cropped image. A noisy raw image 112 is thus preprocessed before applying the deep learning technique to avoid trapping to a local minima. A preprocessed image can be derived from the original cropped image by image enhancement and directional smoothing. A raw orientation map can be derived from the cropped image. In one example, a minutiae density map is derived from detected raw minutiae detected from the cropped image.

Figure 3:
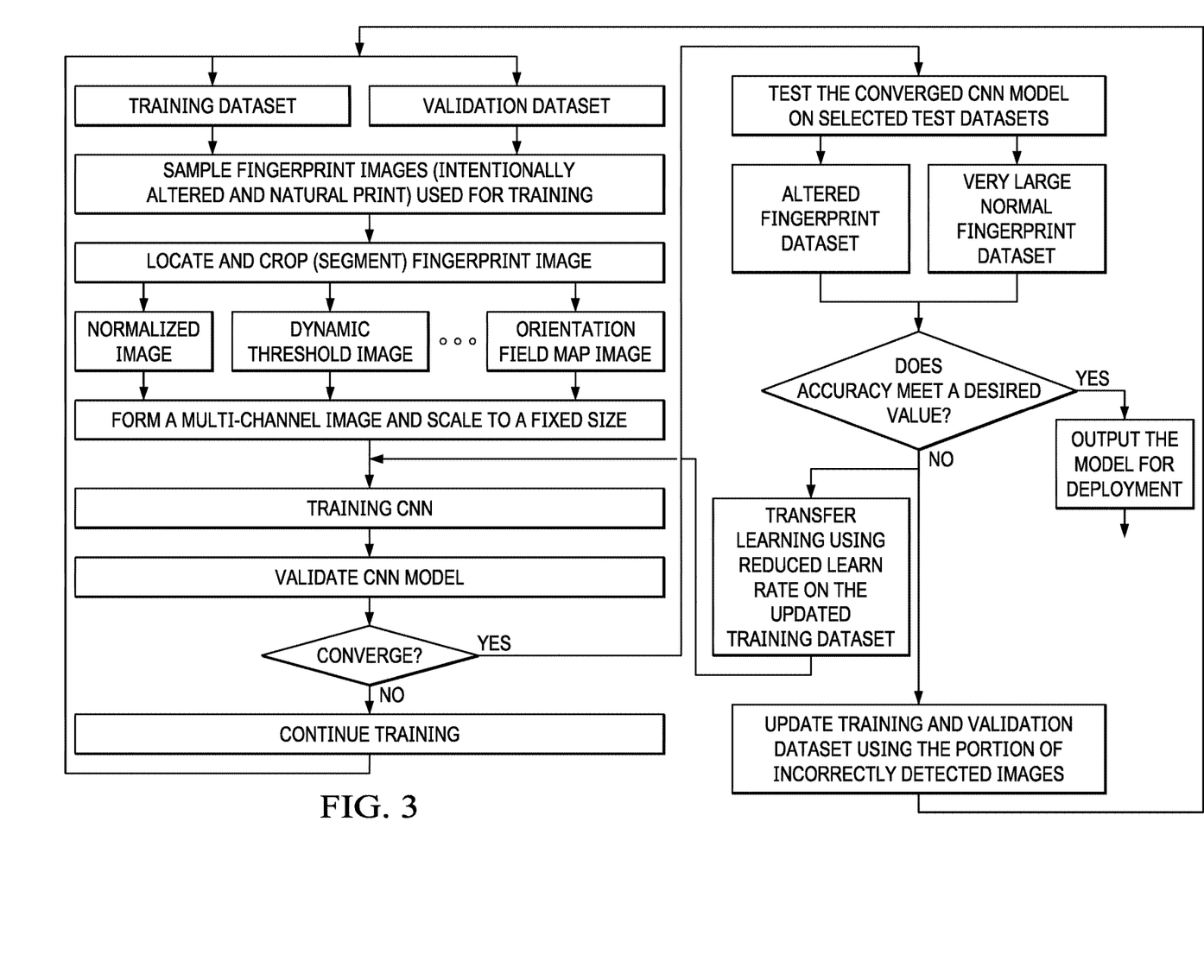
FIG. 3 is a flowchart illustrating an example process for training a machine learning model for detection of altered fingerprints, in accordance with one or more embodiments.

A resulting multi-channel image from the preprocessing module 124 is scaled to a fixed size for training of the machine learning model 128. This process reduces the location variation required to be learned by the deep learning and also maintains the same resolution for all fingerprint images. The altered fingerprint detection system 120 generates a score 132 using the trained machine learning model 128. The score 132 is based on the multiple-channel image and is indicative of a likelihood that the fingerprint has been altered. The score 132 can be compared to a threshold score (degree of confidence). For example, if the score 132 exceeds 70% or 80%, the altered fingerprint detection system 120 determines that the fingerprint has been altered. In another example, if the score 132 exceeds 90%, the altered fingerprint detection system 120 determines that the fingerprint has been altered. In an embodiment, Example Training Process for a Machine Learning Model FIG. 3 is a flowchart illustrating an example process for training a machine learning model 128 for detection of altered fingerprints, in accordance with one or more embodiments. The machine learning model 128 is illustrated and described in more detail with reference to FIG. 1. Several datasets, such as for training, validation, and test are created to build the machine learning model 128. The training dataset is used for training. The validation dataset is used for validation during the training to determine whether the model 128 in the training converges to a similar performance. Sample fingerprint images 112, both intentionally altered and natural print images) are used for training. The preprocessing module 124 determines a spatial location of the fingerprint within the image 112. The preprocessing module 124 crops the image 112 around the spatial location to provide a cropped image. In some embodiments, a ratio of the numbers of intentionally altered sample images to the number of normal fingerprints is smaller (e.g., not greater than 1:6). In one experiment using the disclosed embodiments, about 12,000 altered prints and 65,000 normal fingerprints (i.e., a 1:5 ratio) were randomly selected to construct training and validation datasets: 80% used for training and 20% used for validation.

The preprocessing module 124 generates multiple derived images using the cropped image. In one example, a derived image is generated by normalizing the cropped image using a mean or a variance. In another example, a derived image is generated by creating a binary version of the cropped image using dynamic thresholding. In another example, a derived image is produced by extracting a raw orientation map of the fingerprint within the cropped image. The preprocessing module 124 generates a multiple-channel image using the derived images. The preprocessing module 124 scales the multiple-channel image to an image size. The image size corresponds to a number of inputs of the machine learning model 128. For example, a node of the machine learning model 128 has one or more weighted input connections, a transfer function that combines the inputs in some way, and an output connection. The nodes are organized into layers to comprise the machine learning model 128.

The machine learning model 128 is trained using a particular order of channels of the multiple-channel image. For a variable number of inputs of the machine learning model 128, a recurrent or recursive neural network can be used. The machine learning model 128 imposes an ordering or hierarchy between the inputs of a given row based on the particular order of channels. The detection performance is improved during training, such that the model is not trapped to a local minima. For a smaller number of altered fingerprints, the embodiments disclosed herein obtain a larger number of globally optimal solutions. For example, a the number of intentionally altered sample images can be limited (for example, there can be only about 28,000 intentionally altered fingerprints available for use). However, normal fingerprints available for training can be readily available (for example, there can be more than 2 million prints). In an embodiment, each of training the machine learning model 128 and generating the score 132 using the machine learning model 128 uses the particular order of channels of the multiple-channel image.

The machine learning model 128 being trained can receive transfer learning data using a reduced learn rate on the updated training dataset. A test dataset is used to test the model 128 after the model 128 is converged. The test dataset can be prints, which have seldom been used for training. When the model converges, the converged 128 is tested on selected test datasets. If the machine learning model 128 has not yet converged, the training process is repeated. In some embodiments, some images near a decision boundary between the altered prints and normal prints are selected for training and validation during the training stage. The training and validation datasets are updated using a portion of incorrectly detected images 112. For example, 30,000 normal prints for training and validation datasets are randomly selected from 2 million prints.

When the accuracy of the trained model 128 meets a desired value (e.g., 90% or 99%), the machine learning model 128 is output for deployment. Some normal fingerprints can be far away from the boundary (i.e., different from the altered prints). Some of these normal prints can be redundant, i.e., not contributing to constructing a decision boundary in a meaningful way during training. Such prints can be eliminated or replaced by the prints near the decision boundary between the two classes. In some embodiments, iterative transfer learning is performed using some of the wrongly detected prints from the trained model to update the training and validation datasets, i.e., randomly select some (e.g., 5%) of prints near the decision boundary (the falsely detected (with high score) and missed detected (with low score) randomly from the test dataset to replace some of the prints in the training set which are correctly detected.

In some embodiments where computation power is constrained, the training is applied to single-type derived images instead of plurality-type images. For example, training idea can be performed using each derived image independently to obtain a plurality of machine learning models for each derived image. A score fusion of the machine learning models is performed to obtain an optimal fused score. In some embodiments, training is applied to a simpler network such as Alexnet to achieve better accuracy then a deeper network.

Process for Automatic Detection of Altered Fingerprints

Figure 4:
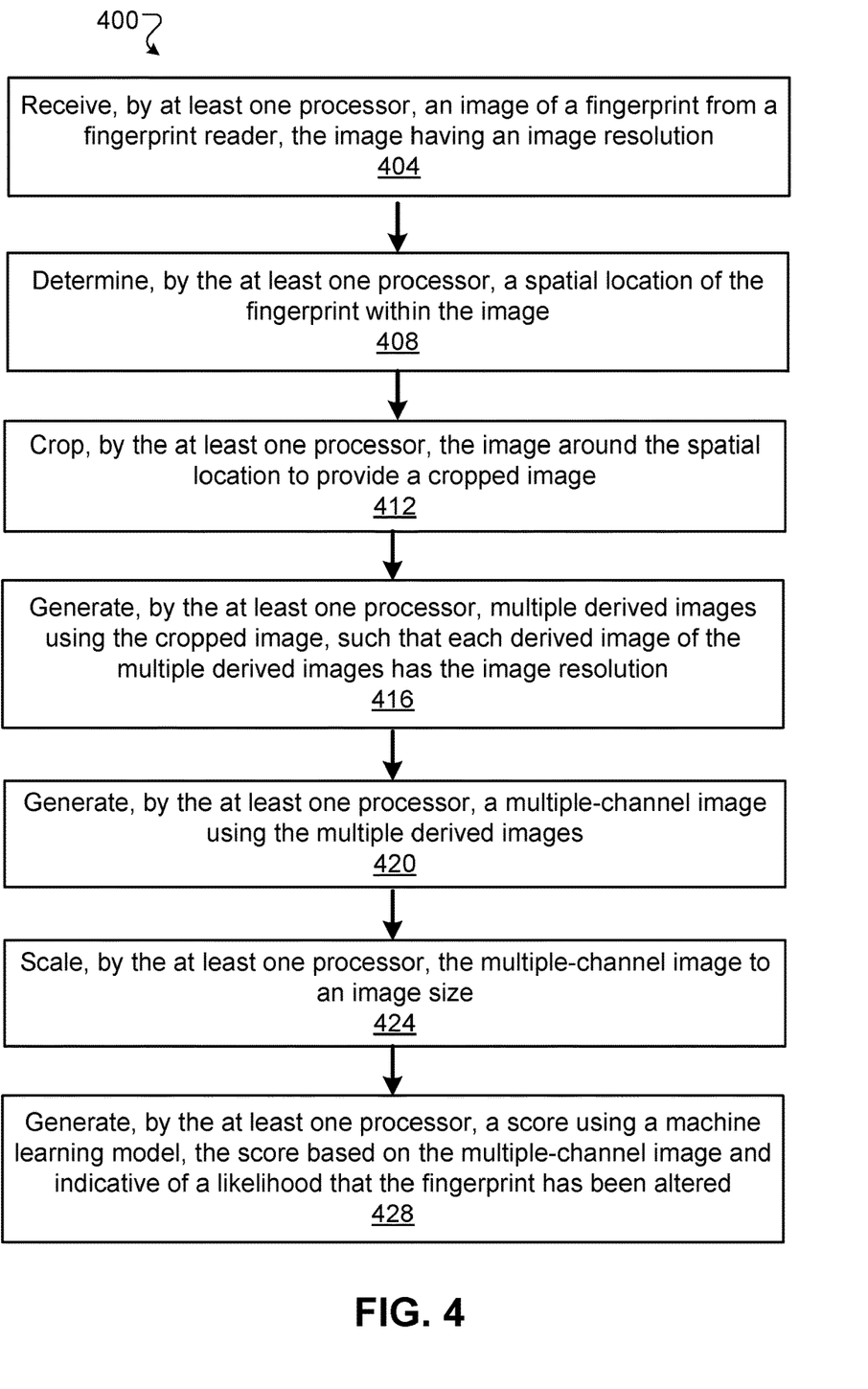
FIG. 4 is a flowchart illustrating an example process for detection of altered fingerprints, in accordance with one or more embodiments.

FIG. 4 is a flowchart illustrating an example process 400 for detection of altered fingerprints, in accordance with one or more embodiments. In some embodiments, the process of FIG. 4 is performed by the altered fingerprint detection system 120. The altered fingerprint detection system 120 is illustrated and described in more detail with reference to FIG. 1. Other entities, for example, one or more components of a computing system 500 perform some or all of the steps of the process 400 in other embodiments. The computer system 500 is illustrated and described in more detail with reference to FIG. 5. Likewise, embodiments can include different or additional steps, or perform the steps in different orders.

The altered fingerprint detection system 120 uses at least one processor 504 to receive (404) an image 112 of a fingerprint from a fingerprint reader 108. The processor 504 is illustrated and described in more detail with reference to FIG. 5. The image 112 and fingerprint reader 108 is illustrated and described in more detail with reference to FIG. 1. The image has an image resolution. The fingerprint reader 108 can be a hand-held or personal digital device that includes a fingerprint image sensor or a camera, e.g., a smartphone, a tablet, a PC, or a laptop. The fingerprint reader 108 captures an image 112 of at least one fingerprint of the user 104 and transmits the image 112 of the fingerprint to the altered fingerprint detection system 120. The user 104 is illustrated and described in more detail with reference to FIG. 1. The resolution can refer to the number of pixels in the image 112 or the width and height of the image 112. For example, the resolution of the image 112 is greater than 200 dots per inch to provide more image detail and sharper features.

The altered fingerprint detection system 120 determines (408) a spatial location of the fingerprint within the image 112. The spatial location refers to an area of the image 112 that is occupied by the fingerprint. The area can be rectangular, oval, circular, etc. For example, the spatial location of the fingerprint in the image 112 can correspond to a bounding box of the fingerprint. The bounding box refers to a smallest bounding or enclosing box for a set of points or pixels in the image, where the set of pixels correspond to the fingerprint. All the points or pixels in the image 112 that correspond to the fingerprint lie within the bounding box. To determine the bounding box, the preprocessing module 124 can use a linear time algorithm to generate a convex polygon (minimum-area enclosing rectangle). The preprocessing module 124 is illustrated and described in more detail with reference to FIG. 1. The preprocessing module 124 identifies a side of a minimum-area enclosing box that is collinear with a side of the convex polygon. The preprocessing module 124 enumerates boxes in linear time using a rotating calipers approach. In some embodiments, the preprocessing module 124 uses an approach to identify a minimum-perimeter enclosing rectangle for pixels that correspond to the fingerprint.

The altered fingerprint detection system 120 crops (412) the image 112 around the spatial location to provide a cropped image. The cropping is performed, such that the cropped image covers a majority of the fingerprint. For example, the cropping is performed at the bounding box. Cropping cuts off a portion of the image 112 to improve framing, increase emphasis on the fingerprint, and remove extraneous information from the image 112. In some embodiments, cropping changes the aspect ratio of the image 112, such that the cropped image has a different aspect ratio.

The altered fingerprint detection system 120 generates (416) multiple derived images using the cropped image, such that each derived image has the image resolution. Features are extracted from the derived images for detecting whether the fingerprint in the image 112 is altered. The derived images thus provide a larger, more diverse collection of characteristics than can be extracted from the image 112 alone. The image resolution of the image 112 is maintained across the multiple derived images, such that the image quality and clarity is not compromised and information is not lost. In some embodiments, the derived images include feature maps extracted from the cropped image. A feature map refers to a collection of physical features extracted from an image. For example, the preprocessing module 124 examines the cropped image using a window whose dimensions are smaller than the cropped image itself. The image is progressively moved sideways as well as up and down the cropped image. The preprocessing module 124 extracts features within the window while moving the window, for example, a horizontal line, a vertical line, a curve, a ridge, a portion of a whorl, or a combination of curves that forms a portion of a circle.

The altered fingerprint detection system 120 generates (420) a multiple-channel image using the derived images. A color digital image includes pixels having combinations of primary colors represented by a series of code. A channel in this context is the grayscale image of the same size as a color image, but having only one primary color. For example, an RGB image has three channels: red, green, and blue. The image includes three derived images (one for each channel). In another example, a CMYK image has four channels: cyan, magenta, yellow, and key (black). A 32-bit CMYK image includes four 8-bit channels, one for cyan, one for magenta, one for yellow, and one for key color (black). In another example, a hue saturation value (HSV) stores color information in three channels, however, one channel is devoted to brightness (value), and the other two convey color information.

The altered fingerprint detection system 120 scales (424) the multiple-channel image to an image size. For example, the preprocessing module 124 scales the graphic primitives that make up the image using geometric transformations. The scaled image has a higher or lower number of pixels. In some embodiments, image resampling or image reconstruction is performed using Nyquist sampling. Down sampling to a smaller image from a higher-resolution image is carried out after applying a suitable two-dimensional (2D) anti-aliasing filter to prevent aliasing artifacts. The multi-channel image is reduced to the information that can be carried by the smaller image. For up sampling, a reconstruction filter takes the place of the anti-aliasing filter.

Figure 5:
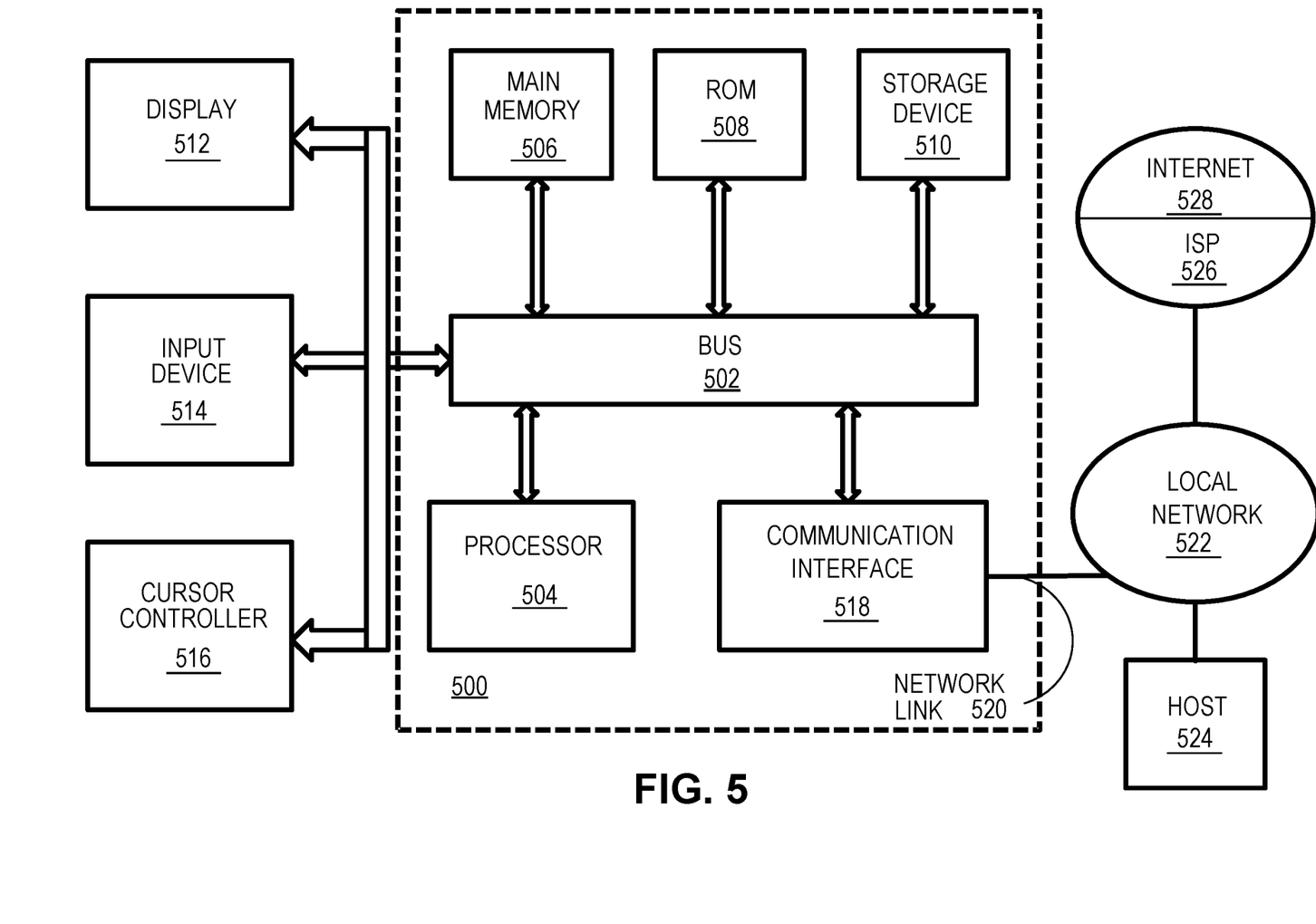
FIG. 5 is a block diagram illustrating an example computer system, in accordance with one or more embodiments.

The altered fingerprint detection system 120 generates (428) a score using the machine learning model 128, illustrated and described in more detail with reference to FIG. 1. The score is based on the multiple-channel image and indicative of a likelihood that the fingerprint has been altered. In some embodiments, the altered fingerprint detection system 120 generates a graphical representation of at least one of the score, the image 112, the cropped image, a set of the features extracted, or the multi-channel image on a display device. For example, the display 512, illustrated and described in more detail with reference to FIG. 5, is used. The graphical representation can include a histogram, pie chart, bar graph, images, and text.

Example Computer System for Detection of Altered Fingerprints

FIG. 5 is a block diagram illustrating a computer system 500, in accordance with one or more embodiments. In an implementation, the computer system 500 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 500 includes a bus 502 or other communication mechanism for communicating information, and a hardware processor 504 coupled with a bus 502 for processing information. The hardware processor 504 is, for example, a general-purpose microprocessor. The computer system 500 also includes a main memory 506, such as a random-access memory (RAM) or other dynamic storage device, coupled to the bus 502 for storing information and instructions to be executed by processor 504. In one implementation, the main memory 506 is used for storing temporary variables or other intermediate information during execution of instructions to be executed by the processor 504. Such instructions, when stored in non-transitory storage media accessible to the processor 504, render the computer system 500 into a special-purpose machine that is customized to perform the operations specified in the instructions.

In an embodiment, the computer system 500 further includes a read only memory (ROM) 508 or other static storage device coupled to the bus 502 for storing static information and instructions for the processor 504. A storage device 510, such as a magnetic disk, optical disk, solid-state drive, or three-dimensional cross point memory is provided and coupled to the bus 502 for storing information and instructions.

In an embodiment, the computer system 500 is coupled via the bus 502 to a display 512, such as a cathode ray tube (CRT), a liquid crystal display (LCD), plasma display, light emitting diode (LED) display, or an organic light emitting diode (OLED) display for displaying information to a computer user. An input device 514, including alphanumeric and other keys, is coupled to bus 502 for communicating information and command selections to the processor 504. Another type of user input device is a cursor controller 516, such as a mouse, a trackball, a touch-enabled display, or cursor direction keys for communicating direction information and command selections to the processor 504 and for controlling cursor movement on the display 512. This input device typically has two degrees of freedom in two axes, a first axis (e.g., x-axis) and a second axis (e.g., y-axis), that allows the device to specify positions in a plane.

According to one embodiment, the techniques herein are performed by the computer system 500 in response to the processor 504 executing one or more sequences of one or more instructions contained in the main memory 506. Such instructions are read into the main memory 506 from another storage medium, such as the storage device 510. Execution of the sequences of instructions contained in the main memory 506 causes the processor 504 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 510. Volatile media includes dynamic memory, such as the main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 502. Transmission media can also take the form of acoustic or light waves, such as those generated during radio-wave and infrared data communications.

In an embodiment, various forms of media are involved in carrying one or more sequences of one or more instructions to the processor 504 for execution. For example, the instructions are initially carried on a magnetic disk or solid-state drive of a remote computer. The remote computer loads the instructions into its dynamic memory and send the instructions over a telephone line using a modem. A modem local to the computer system 500 receives the data on the telephone line and use an infrared transmitter to convert the data to an infrared signal. An infrared detector receives the data carried in the infrared signal and appropriate circuitry places the data on the bus 502. The bus 502 carries the data to the main memory 506, from which processor 504 retrieves and executes the instructions. The instructions received by the main memory 506 may optionally be stored on the storage device 510 either before or after execution by processor 504.

The computer system 500 also includes a communication interface 518 coupled to the bus 502. The communication interface 518 provides a two-way data communication coupling to a network link 520 that is connected to a local network 522. For example, the communication interface 518 is an integrated service digital network (ISDN) card, cable modem, satellite modem, or a modem to provide a data communication connection to a corresponding type of telephone line. As another example, the communication interface 518 is a local area network (LAN) card to provide a data communication connection to a compatible LAN. In some implementations, wireless links are also implemented. In any such implementation, the communication interface 518 sends and receives electrical, electromagnetic, or optical signals that carry digital data streams representing various types of information.

The network link 520 typically provides data communication through one or more networks to other data devices. For example, the network link 520 provides a connection through the local network 522 to a host computer 524 or to a cloud data center or equipment operated by an Internet Service Provider (ISP) 526. The ISP 526 in turn provides data communication services through the world-wide packet data communication network now commonly referred to as the "Internet" 528. The local network 522 and Internet 528 both use electrical, electromagnetic, or optical signals that carry digital data streams. The signals through the various networks and the signals on the network link 520 and through the communication interface 518, which carry the digital data to and from the computer system 500, are example forms of transmission media. In an embodiment, the network 520 contains the cloud 202 or a part of the cloud 202 described above.

The computer system 500 sends messages and receives data, including program code, through the network(s), the network link 520, and the communication interface 518. In an embodiment, the computer system 500 receives code for processing. The received code is executed by the processor 504 as it is received, and/or stored in storage device 510, or other non-volatile storage for later execution.

Various implementations of devices, systems, and techniques described herein can be realized in digital electronic modulery, integrated modulery, specially designed ASICs (application specific integrated modules), computer hardware, firmware, software, or combinations thereof. These various implementations can include implementation in one or more computer programs that are executable or interpretable on a programmable system including at least one programmable processor, which can be special or general purpose, coupled to receive data and instructions from, and to transmit data and instructions to, a storage system, at least one input device, and at least one output device.

Implementations can involve computer programs (also known as programs, software, software applications or code) include machine instructions for a programmable processor, and can be implemented in a high-level procedural or object-oriented programming language, or in assembly or machine language. As used herein, the terms "machine-readable medium" "computer-readable medium" refers to any computer program product, apparatus or device (e.g., magnetic discs, optical disks, memory, Programmable Logic Devices (PLDs)) used to provide machine instructions or data to a programmable processor, including a machine-readable medium that receives machine instructions as a machine-readable signal. The term "machine-readable signal" refers to any signal used to provide machine instructions or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated modules).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method comprising:
   receiving, by at least one processor, an image of a fingerprint from a fingerprint reader, the image having an image resolution;
   determining, by the at least one processor, a spatial location of the fingerprint within the image;
   cropping, by the at least one processor, the image around the spatial location to provide a cropped image;
   generating, by the at least one processor, a plurality of derived images using the cropped image, such that each derived image of the plurality of derived images has the image resolution;
   generating, by the at least one processor, a multiple-channel image using the plurality of derived images, the multiple-channel image comprising a stack of at least two of the plurality of derived images;
   scaling, by the at least one processor, the multiple-channel image to an image size; and
   generating, by the at least one processor, a score using a machine learning model, wherein the score is based on the multiple-channel image and indicative of a likelihood that the fingerprint has been altered.

2. The method of claim 1, wherein the image of the fingerprint is associated with a roll method or a slap method.

3. The method of claim 1, wherein the image resolution is greater than 200 dots per inch.

4. The method of claim 1, wherein the spatial location of the fingerprint within the image corresponds to a bounding box of the fingerprint, and cropping the image is performed at the bounding box.

5. The method of claim 1, wherein cropping the image is performed, such that the cropped image covers a majority of the fingerprint.

6. The method of claim 1, wherein generating the plurality of derived images comprises extracting, by the at least one processor, a plurality of feature maps from the cropped image.

7. The method of claim 1, wherein generating the plurality of derived images comprises normalizing, by the at least one processor, the cropped image using a mean or a variance.

8. The method of claim 1, wherein generating the plurality of derived images comprises generating, by the at least one processor, a binary version of the cropped image using dynamic thresholding.

9. The method of claim 1, wherein generating the plurality of derived images comprises preprocessing, by the at least one processor, the cropped image using image enhancement or directional smoothing.

10. The method of claim 1, wherein generating the plurality of derived images comprises extracting, by the at least one processor, a raw orientation map of the fingerprint within the cropped image.

11. The method of claim 1, wherein generating the plurality of derived images comprises extracting, by the at least one processor, a ridge skeleton map of the fingerprint within the cropped image.

12. The method of claim 1, wherein generating the plurality of derived images comprises generating, by the at least one processor, a minutiae density map derived from raw minutiae in the cropped image.

13. The method of claim 1, wherein:
   a number of channels of the multiple-channel image equals a number of derived images in the stack; and
   an order of the channels is associated with a designated sequence of the derived images in the stack.

14. The method of claim 1, wherein each of training the machine learning model and generating the score using the machine learning model uses a particular order of channels of the multiple-channel image.

15. The method of claim 1, wherein the image size corresponds to a number of inputs of the machine learning model.

16. A system comprising:
   at least one computer processor; and
   at least one non-transitory storage media storing instructions which, when executed by the at least one computer processor, cause the at least one computer processor to:
   receive an image of a fingerprint from a fingerprint reader, the image having an image resolution;
   determine a spatial location of the fingerprint within the image;
   crop the image around the spatial location to provide a cropped image;
   generate a plurality of derived images using the cropped image, such that each derived image of the plurality of derived images has the image resolution;

generate a multiple-channel image using the plurality of derived images, the multiple-channel image comprising a stack of at least two of the plurality of derived images;

scale the multiple-channel image to an image size; and generate a score using a machine learning model, wherein the score is based on the multiple-channel image and indicative of a likelihood that the fingerprint has been altered.

17. The system of claim 16, wherein the image of the fingerprint is associated with a roll method or a slap method.

18. One or more non-transitory storage media storing instructions which, when executed by at least one computer processor, cause the at least one computer processor to:

receive an image of a fingerprint from a fingerprint reader, the image having an image resolution;

determine a spatial location of the fingerprint within the image;

crop the image around the spatial location to provide a cropped image;

generate a plurality of derived images using the cropped image, such that each derived image of the plurality of derived images has the image resolution;

generate a multiple-channel image using the plurality of derived images, the multiple-channel image comprising a stack of at least two of the plurality of derived images;

scale the multiple-channel image to an image size; and generate a score using a machine learning model, wherein the score is based on the multiple-channel image and indicative of a likelihood that the fingerprint has been altered.

19. The one or more non-transitory storage media of claim 18, wherein the image of the fingerprint is associated with a roll method or a slap method.

* * * * *